Sept. 15, 1964 B. N. HOFFSTROM 3,148,427

CONNECTORS

Filed May 26, 1961 2 Sheets-Sheet 1

INVENTOR
Bo N. Hoffstrom

BY Strauch, Nolan & Neale

ATTORNEYS

Sept. 15, 1964 B. N. HOFFSTROM 3,148,427

CONNECTORS

Filed May 26, 1961 2 Sheets-Sheet 2

INVENTOR
Bo N. Hoffstrom

BY Strauch, Nolan + Neale

ATTORNEYS

United States Patent Office
3,148,427
Patented Sept. 15, 1964

3,148,427
CONNECTORS
Bo N. Hoffstrom, Santa Monica, Calif., assignor to Douglas Aircraft Company, Inc., Santa Monica, Calif.
Filed May 26, 1961, Ser. No. 112,865
4 Claims. (Cl. 24—196)

This invention relates to connectors and more particularly to connectors for use with flat tapes or webs.

Flat tapes or webs are in many cases preferred to round cables for load transmission. For example, tapes offer a distinct advantage when used as cargo slings since they provide a flat load engaging surface which substantially reduces the possibility of damage to the load and eliminates the cutting action often associated with ropes, wires or cables. Also, tapes can safely be coiled on a drum under much higher loads than ropes, wires or cables.

However the use of tapes or webs has been limited to some extent because of the lack of suitable means for attaching the end of the tape to the load or another force applying or force transmitting device. Experience has shown that connectors developed for round strands are not suitable for use with flat tapes since they produce stress concentration which causes the tape to break at loads well below those which the main body of the tape can accommodate safely.

With these considerations in mind, it is the principal purpose and object of the present invention to provide improved connectors for tapes or webs which develop substantially all of the strength of the tape or web.

It is a further object of the present invention to provide connectors which permit easy connection and disconnection of the tapes.

It is also an object of the present invention to provide novel tape connectors which are of simplified and relatively inexpensive, rugged construction.

In attaining these and other objcts, the present invention provides novel tape connectors in which the tape is received in wedging spaces, the walls of which are deformed upon the application of load and assume a configuration under maximum load which effects optimum load distribution and substantially eliminates stress concentration associated with prior constructions.

Additional objects and advantages will become apparent as the description proceeds in connection with the accompanying drawings in which.

While the connectors of the present invention are of broad utility, they will be disclosed in two forms which are effective to transmit very high loads. For example, in a typical case the tapes or webs which they accommodate are approximately 0.2″ in thickness and 7″ in width and can support a load in the neighborhood of 50,000 lbs.

It is under conditions of high load operation that the advantages of the connectors of the present invention are most fully realized.

Figure 1:
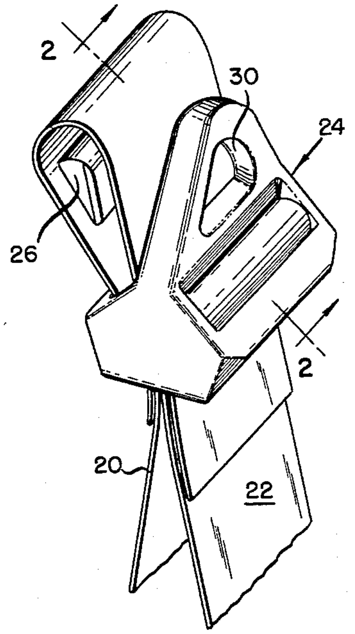
FIGURE 1 is a perspective view of a tape connector embodying the present invention.
Figure 2:
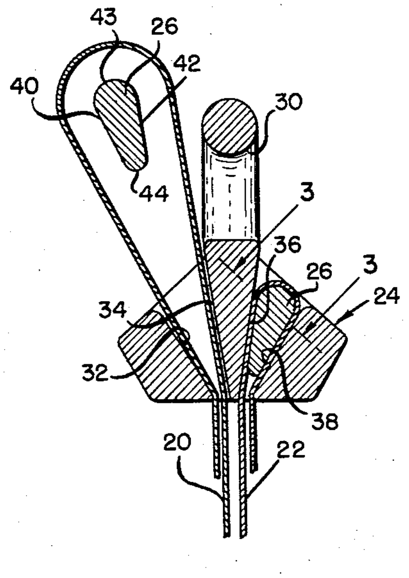
FIGURE 2 is a central transverse section of the connector taken along line 2—2 of FIGURE 1.
Figure 3:
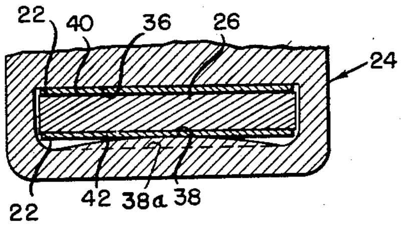
FIGURE 3 is a fragmentary section taken along line 3—3 of FIGURE 2.

Referring now more particularly to the drawings and especially to the form of the invention shown in FIGURES 1, 2 and 3, the connector thereshown is especially adapted for connecting a pair of tapes 20 and 22 to a load or force transmitting member (not shown). The connector comprises a main body member indicated generally at 24 and a pair of identical wedges 26. The body member 24, which is of symmetrical construction, is provided with a centrally located eye 30 at the opposite sides of which are wedge openings having walls 32 and 34 and 36 and 38, respectively. As best shown in FIGURE 2, the walls 32–34 and 36–38 converge in a direction away from the eye 30 and the central axes of the wedge openings also converge in a direction away from the eye. The length of the wedge openings is slightly greater than the width of the tape to be used with the connector.

The wedges 26, which are of identical configuration, are provided with converging side walls 40 and 42 connected at their upper ends by a smoothly curved top surface 43 and connected at their opposite ends by a smoothly curved bottom surface 44. Preferably the angle between the side walls 40 and 42 of the wedge is the same as the angle between the side walls 32, 34 and 36, 38 of the wedge cavities.

It is a feature of the present invention that the spaces at the outer sides of the wedges in which the tape is received when the tapes are installed as shown in FIGURE 2 are of nonuniform thickness under relatively light loads and that the configuration of these spaces changes with an increase in load to effect optimum load distribution and avoid stress concentration. For this purpose, as best shown in FIGURE 3, the outer walls 32 and 38 of the wedge cavities are slightly inwardly crowned. In a typical case where the tape is 7″ by 0.2″ the crown has a maximum depth of 0.050″ at the point midway of the ends of the wedge cavity. For purposes of illustration, the crown is shown exaggerated in FIGURE 3.

Initially the wedging engagement between the outer side of the wedge, the outer wall of the wedge cavity and the tape is greatest adjacent the center of the tape. As the load applied to the tape is increased, the outer wall of the wedge cavity deflects outwardly, and as the load approaches the design maximum for the tape, the outer wall of the wedge cavity becomes substantially parallel with the outer wall of the wedge as shown by the dotted line 38*a* in FIGURE 3, thus distributing the load on the tape over its full lateral surface.

In all known prior constructions where the walls of the wedge and the walls of the wedge cavity are initially formed parallel, the application of load produces a severe pinching action on the edges of the tape where it is most subject to damage and the stress concentration at these points causes breakage of the tape at applied loads which are well below the ability of the main body of the tape to carry.

The deformation of the walls of the wedge cavities is arranged well within the elastic limit of the connector assembly so that when the load is relaxed the walls of the wedge cavities return to their initial crowned form.

While, as shown in FIGURE 3, the variation in width of the spaces in which the tape is initially received is achieved by crowning one of the walls of the wedge cavity, it is to be understood that the same effect can be produced by the use of wedge cavities having straight walls and crowning one of the walls of the wedge. In either case the result is substantially the same, i.e. the width of the space in which the tape is initially received varies between the lateral edges of the tape and under full load, the width of this space becomes uniform from edge to edge.

After the load has been relaxed, the tapes may be removed or adjusted by loosening the wedges with a hammer blow or a screwdriver.

Figure 6:
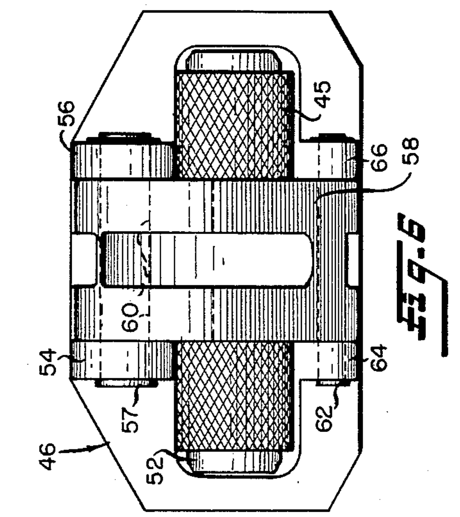
FIGURE 6 is an end view of the tape connector of FIGURE 4.
Figure 4:
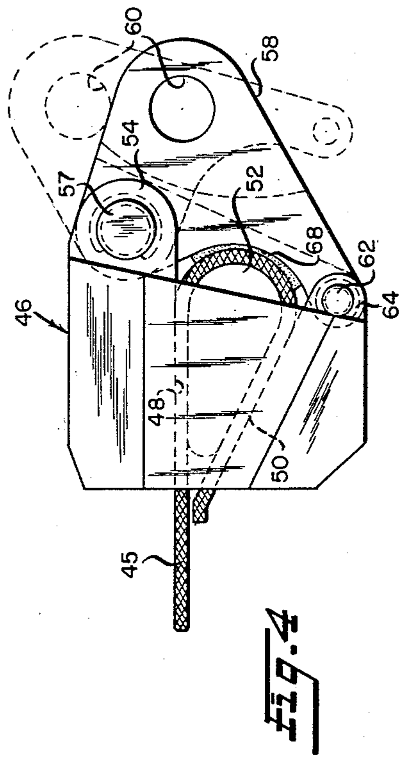
FIGURE 4 is a side elevation of a further embodiment of the tape connector of the present invention.
Figure 5:
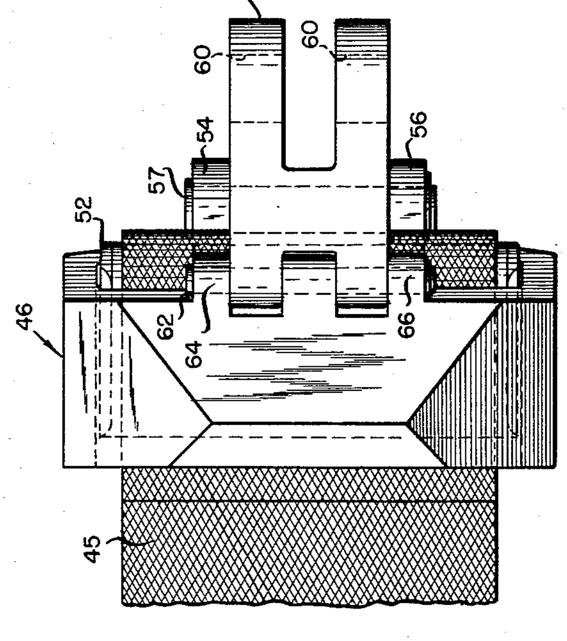
FIGURE 5 is a bottom view of the tape connector of FIGURE 4.

A further embodiment of the invention is shown in FIGURES 4, 5 and 6 to which detailed reference will now be made. This form of the invention is adapted for use with a single tape 45. The connector comprises a main body member 46 having an elongated wedge opening defined by converging side walls 48 and 50 adapted to receive a wedge member 52 which has the same configuration as the wedges 26 of the previous embodiment. The relationship between the side walls of the wedge 52 and the side walls 48 and 50 of the wedge opening is the same as the relation of the walls 38 and 42 in the previous embodiment, i.e., the spaces at both sides of the wedge are initially of non-uniform thickness.

The end of the connector block 46 through which the wedge 52 is inserted is provided with a pair of ears 54 and 56 which carry a pin 57 on which a shackle 58 is pivotally mounted. The shackle 58 has openings 60 for attachment to an anchor, load, or load transmitting device, the centers of which are in direct alignment with the main length of the tape 45. The shackle is retained in place by a removable locking pin 62 which extends through a pair of ears 64 and 66 on the connector block 46 and through the end portion of the shackle.

When the shackle is in operation position and the pin 62 is in place, a cushion of foam rubber or like material 68 is held against the bight of the tape to hold the wedge 52 lightly in seated position. Thus the shackle effectively retains the wedge in place and prevents its accidental dislodgement by impact forces.

In use, with a hinged shackle 58 released, a loop of the tape is inserted in the jaw. The wedge is placed in the loop and seated hand tight. The hinge is then closed and secured by the insertion of the removable lock pin 62. After the hinge has been closed, the connector is ready to take full load without further preparation. The tape can be replaced in a matter of minutes. Actual tests have shown that no slippage occurs and that the breaking load of the tape is only slightly reduced by stress concentration caused by the connector. In this form of the device, the improved performance is due not only to the non-parallel relationship between the side walls of the wedge and the wedge cavity, but also because of the direct alignment between the axis of the tape when loaded and the center of the load carrying openings 60 in the shackle.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A connector for flat tape comprising a block having a wedge cavity having converging walls, a wedge member having correspondingly converging walls adapted to be received in said wedge cavity with the end of said tape looped around it, said wedge member and said block being formed to provide tape receiving spaces at opposite sides of said wedge member which are of elongated substantially rectangular section of essentially the same configuration as the section of said tape, the spacing between at least one wall of said wedge cavity and the wedge being slightly less at the lateral center of said tape than at the edges thereof when the tape is unloaded, and said one wall being yieldable under high loads to increase said spacing between said walls at the lateral center of said tape, and an attaching device carried by said block.

2. A connector according to claim 1 wherein said attaching device is formed integrally with said block.

3. The connector according to claim 1 wherein said attaching device is hingedly mounted on said block and means are provided to retain said attaching device in a predetermined operating position.

4. A connector for flat tape comprising a block having a pair of wedge cavities in side-by-side relation separated by an attaching device, said wedge cavities each having inner and outer converging walls, wedge members having correspondingly converging side walls and adapted to be received in the respective wedge cavities, with the end of one of said tapes looped around one of said wedges and the end of the other tape looped around the other of said wedges, said wedge members and said block being formed to provide tape receiving spaces at opposite sides of said wedge member which have elongated substantially rectangular section of essentially the same configuration as the section of said tape, the spacing between the outer walls of said wedge cavities and said wedges being slightly less at the lateral center of said tape than at the edges of said tape when said tapes are unloaded, and said outer walls of said tape receiving spaces being yieldable under high load to increase said spacing at the lateral center of said tape.

References Cited in the file of this patent

UNITED STATES PATENTS

| | | |
|---|---|---|
| 201,431 | Logue | Mar. 19, 1878 |
| 249,259 | Riehlé | Nov. 8, 1881 |
| 2,540,888 | Hyatt | Feb. 6, 1951 |
| 2,946,619 | Wahl | July 26, 1960 |